United States Patent [19]

Harwell et al.

[11] Patent Number: 4,921,292

[45] Date of Patent: May 1, 1990

[54] MAGNETIC ATTACHMENT MECHANISM

[75] Inventors: William D. Harwell; Mitchell B. Wu, both of Houston, Tex.

[73] Assignee: The United States of America as represented by the Administrator of the National Aeronautics and Space Administration, Washington, D.C.

[21] Appl. No.: 248,010

[22] Filed: Sep. 23, 1988

[51] Int. Cl.$^5$ ............................................. B66C 1/04
[52] U.S. Cl. .................................... 294/65.5; 335/286
[58] Field of Search ............... 294/65.5; 335/285, 286, 335/287

[56] References Cited

U.S. PATENT DOCUMENTS

| | | | |
|---|---|---|---|
| 2,243,616 | 5/1941 | Bing et al. | 175/367 |
| 2,915,682 | 12/1959 | Bower | 317/159 |
| 3,335,378 | 8/1967 | Corvino | 294/65.5 |
| 3,406,837 | 10/1968 | Kirsch et al. | 214/1 |
| 3,452,310 | 6/1969 | Israelson | 335/286 |
| 3,878,596 | 4/1975 | Iwai | 29/211 |
| 4,287,459 | 9/1981 | Dahlstrom | 318/568 |
| 4,465,993 | 8/1984 | Braillon | 335/287 |
| 4,504,088 | 3/1985 | Carter | 294/65.5 |

FOREIGN PATENT DOCUMENTS

1253932 2/1986 U.S.S.R. .............................. 294/65.5

Primary Examiner—Margaret A. Focarino
Assistant Examiner—Dean J. Kramer
Attorney, Agent, or Firm—Hardie R. Barr; John R. Manning; Edward K. Fein

[57] ABSTRACT

A magnetic attachment mechanism adapted for interfacing with the manipulator arm (11) of a remote manipulator system and comprising a pair of permanent magnets (31,32) of rare earth material which are arranged in a stator-rotor relationship. The rotor magnet (32), is journalled for rotation about its longitudinal axis between pole plates (35,36) of the stator magnet (31), each of which includes an adhering surface (35a,36a). In a first rotary position corresponding to the "ON" condition, each of the poles of the rotor magnet (32) is closely adjacent a stator magnet pole plate of like polarity whereby the respective magnet fields are additive for producing a strong magnetic field emanating from the adhering surfaces (35a,36a) for attracting a ferrous magnetic plate 20, or the like, affixed to the payload (20 or 50). When the rotor magnet (32) is rotated to a second position corresponding to the "OFF" condition, each of the poles of the rotor magnet (31) is disposed closely adjacent a pole plate of unlike polarity whereby the magnetic fields of the magnets are in cancelling relationship at the adhering surfaces (35a,36a) which permits the release of a payload. An actuator (51 or 70) for selectively rotating the rotor magnet (32) between the "ON" and "OFF" positions is provided for interfacing and connecting the magnetic attachment mechanism with a manipulator arm. For effecting an optimal rigidized attachment the payload is provided with guides (91,92) cooperable with guides (96,16,17) on the housing of the mechanism for directing adhering surfaces (35a,36a) of the polar plates to the ferrous plate (20).

5 Claims, 5 Drawing Sheets

MAGNETIC ATTACHMENT MECHANISM

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

This invention relates to article handling devices and more particularly to a magnetic attachment and holding device which utilizes the attractive force of permanent magnets to ferrous materials for attaching an object or payload.

BACKGROUND ART

In a wide variety of activities involving the handling and deployment of objects, such as maneuvering a payload from a spacecraft bay to a deployment position or grappling a free-flying payload, a remotely operated manipulator system is usually provided. For almost all such applications, the grappling device or end effector associated with the manipulator arm is desirably of small size, light weight, and readily adaptable to handling payloads of various sizes, masses, and shapes. Although magnetic devices which incorporate permanent magnets have sometimes been used as attachment mechanisms in lieu of mechanical gripping devices because of their relative simplicity and other desirable features, these generally have not provided a sufficiently high attractive force nor also the ability to exhibit sufficiently low residual magnetic force necessary for effecting a release. For example, U.S. Pat. No. 3,406,837 discloses a work transfer device wherein the gripping mechanism may be a magnetic gripper for workpieces of magnetically-attracted ferrous metal and an ejector pin is used to eject the workpiece.

U.S. Pat. No. 3,878,596 discloses a workpiece assembly apparatus which incorporates a magnetic chuck on a robot arm and U.S. Pat. No. 4,287,459 disclose an industrial robot with a robot hand which may be an electromagnet.

U.S. Pat. No. 2,915,682 discloses a lifting magnet with a lifting surface of concentric and separated pole pieces and permanent magnet material movably mounted by a ratchet mechanism so that its flux may be directed into and out of a circuit including the pole pieces and a ferromagnetic payload.

U.S. Pat. No. 2,243,616 discloses a lifting magnet device having a cylindrically shaped permanent magnet mounted for rotation about its cylinder axis between a pair of soft iron pole pieces to a first rotary position which completes a magnetic circuit through a payload for lifting the same or to a second rotary position which effects its release. All of the above are characterized by either complex mechanisms and/or weak holding forces which are often inadequate.

SUMMARY OF THE INVENTION

This invention is a magnetic attachment mechanism which is adapted for interfacing with the manipulator arm of a remote manipulator system and is operable therewith for effecting the seizure and manipulation of objects, such as a payload in the environment of outer space. The invention comprises a pair of permanent magnets of rare earth material which are arranged in a stator-rotor relationship with respect to one another, and an actuator means for selectively rotating the rotor magnet between "ON" and "OFF" positions with respect to the stator magnet.

The rotor magnet, elongate in form, is journalled for rotation about its longitudinal axis between a pair of pole plates affixed to the stator magnet, each of which includes an adhering surface for the magnetic attachment mechanism. In a first rotary position corresponding to the "ON" condition of the mechanism, each of the poles of the rotor magnet is disposed closely adjacent a stator magnet pole plate of like polarity whereby the respective magnetic fields of the two magnets are in an additive relationship for producing a strong magnetic field emanating from the adhering surfaces of the pole plates and exerting a powerful attractive force on a magnetic plate, or the like, affixed to a payload.

When the rotor magnet is rotated from the first position to a second rotary position corresponding to the "OFF" condition of the mechanism, each of the poles of the rotor magnet is disposed closely adjacent a stator magnet pole plate of unlike polarity whereby the respective magnetic fields of the two magnets are in a cancelling relationship with each other at the adhering surfaces. The weak magnetic field exhibited therefrom permits the release of a payload which may have been held attached by the mechanism. The mechanism is further provided with an actuator for selectively rotating the rotor magnet between the "ON" and "OFF" positions, which actuator is adapted for interfacing connection and operative association with the manipulator arm of a remote manipulator system. For effecting an optimal rigidized attachment with a payload, the payload is provided with a ferrous plate of magnetic material and guide means cooperable with guide means on the housing of the magnet assembly for directing the adhering surfaces of the stator magnet polar plates to the ferrous plate of the payload.

DETAILED DESCRIPTION OF THE INVENTION

Figure 1:
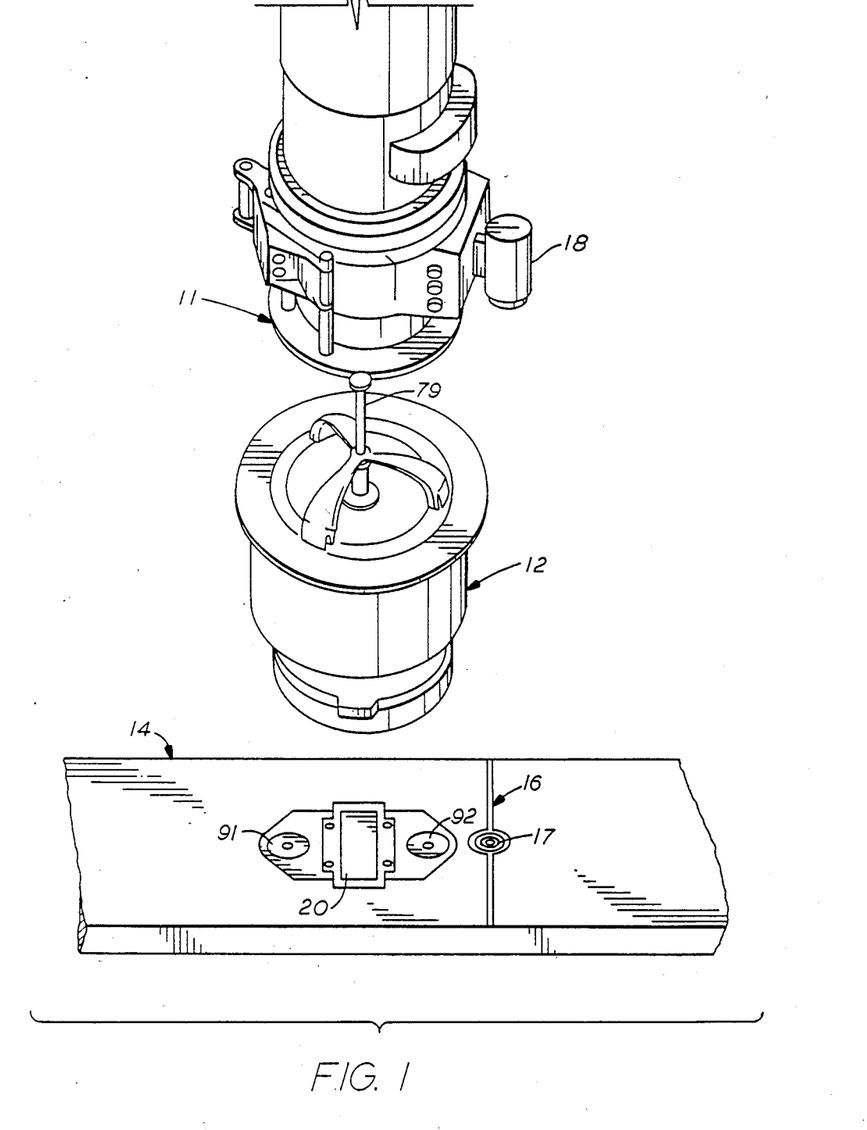
FIG. 1 is an exploded view in perspective showing the end portion of the manipulator arm of a remote manipulator system, the magnetic attachment mechanism of the invention which is adapted to be operably connected to the end of the manipulator arm, and a portion of a payload structure adapted by means of a ferrous plate thereon be to magnetically attracted to the magnetic attachment mechanism.

Referring more particularly to the drawings, there is shown in FIG. 1 in exploded relation, an end portion of the manipulator arm 11 of a remote manipulator system and a magnetic attachment mechanism 12 representing a preferred embodiment of the invention which is adapted to be connected to the end of the manipulator arm in operative association therewith. When mounted on the manipulator arm, the magnetic attachment mechanism 12 may be guided and controlled to effect an attachment to an object to be captured.

In the application of the invention, as illustrated in FIG. 1, the object 14 represents a payload in the environment of outer space which has been provided with any variety of visual alignment aide, such as a painted target 16 and a sunken parallax post 17 which when viewed by a video camera 18 mounted on the manipulator arm allows the remote manipulator system (not shown) to guide the magnetic attachment mechanism 12 into contact with a ferrous plate 20 which is mounted on the object 14, as will be later described herein, to facilitate a capture and permit a rigidized attachment to the object and its effective capture.

Figures 2, 4:
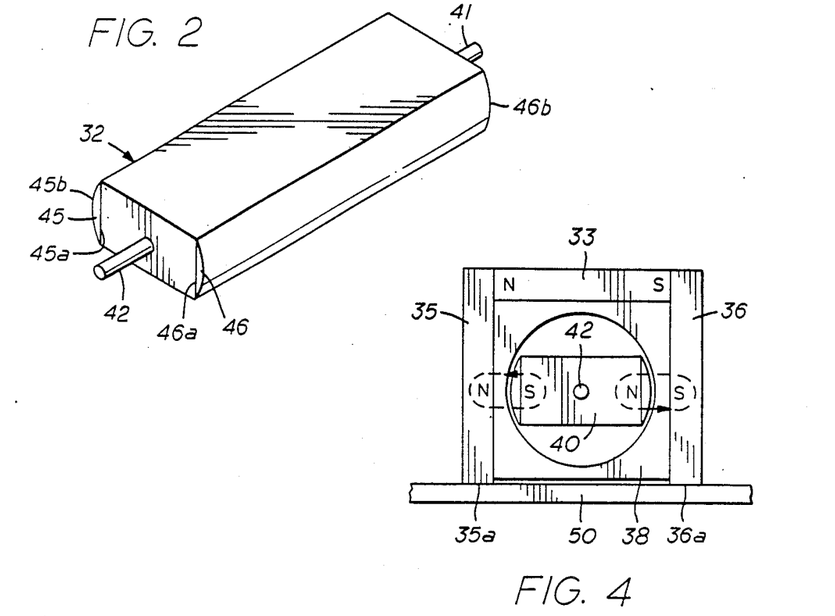
FIG. 2 is a view in perspective of the permanent magnet which is mounted as a rotor in the arrangement of permanent magnets in the invention.
FIG. 4 is an end view of the permanent magnet assembly of FIG. 3 but showing the rotor magnet in the "OFF" position wherein the magnetic fields of the two magnets are in a cancelling relationship at the attaching face of the mechanism.
Figure 3:
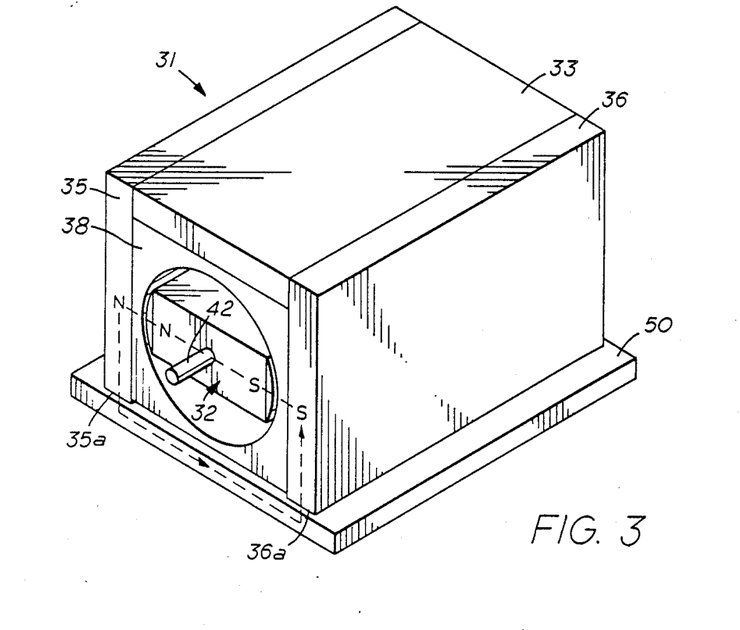
FIG. 3 is a view in perspective of the two permanent magnets of the magnetic attachment mechanism assembled in a stator-rotor relationship with the rotor magnet of FIG. 2 in the "ON" position wherein the magnetic fields of the two magnets are in additive relationship at the attaching face of the mechanism.

The magnetic attachment mechanism 12 is comprised of a pair of permanent rare earth magnets 32 and 33 arranged in a stator-rotor relationship with respect to one another, as best seen in FIGS. 3 and 4. The magnet 31, which serves as the stationary magnet, is comprised of an elongate rectangular block 33 of rare earth magnetic material and a pair of rectangular pole plates 35, 36 of ferrous material. The magnet block 33 is placed against a face of a support block 38 of non-magnetic ferrous material which is substantially square in cross section and of equal length and width with respect to the adjacent face of the magnet block 33. The pole plates 35, 36 are positioned in contact with the magnet block 33 at opposite narrow sides thereof and along opposite side faces of the support block 38 in contact therewith throughout the length thereof. Although of equal length with the magnet block 33 and support block 38, the vertical dimension of a pole plate as shown in FIG. 4, is slightly greater than that of the blocks 33 and 38 combined so that with the upper surfaces of the pole plates 35, 36 flush with the top face of the magnet block 33, each of the pole plates extends approximately 0.06 inch or 1.4 mm beyond the bottom face of the support block 38. The pole plates 35, 36 serve to concentrate the magnetic lines of force from the poles of the magnet block 33 and direct them to their bottom surfaces 35a, 36a which constitute adhering surfaces at which the magnetic attachment mechanism 12 may attract and attach objects which contain magnetically attractive material.

The support block 38 is formed with a central axial bore 39 in which the magnet 32 is located and mounted as will be further described. The magnet 32, which serves as a rotor, is of elongate form as shown in FIG. 2 with a trunnion 41 and shaft 42 affixed at its opposite ends and in coaxial relation therewith whereby the magnet 32 may be journalled for rotation about its longitudinal axis. The magnet 32 is comprised of a block 40 of rare earth material, rectangular in cross section, with pole pieces 45, 46 of ferrous material which are mechanically affixed, as by welding, an adhesive, or other means, along the narrow side faces of the rectangular block 40. The pole pieces 45, 46 are each formed with a flat planar surface, 45a and 46a respectively, and a curved surface, 45b and 46b respectively. The transverse cross section of each pole piece is thus defined as a segment of a circle and as affixed to the block 40 with its flat planar surface against a side of the block 40, the curved surface of each pole piece 45, 46 is located coaxial with the longitudinal axis of the magnet block 40.

The trunnion 41 and shaft 42 of the rotor 32 are supported in end plates (not shown) of non-magnetic material which are mechanically attached to the stator magnet 31 or the support block 38. The rotor 32 is mounted with its longitudinal axis coaxial with the axis of the bore 39. In addition, the curved surfaces 45b, 46b of the rotor pole pieces are dimensioned so that a very narrow gap, 0.01 inch or approximately 0.025 mm, exists between the pole pieces and the cylindrical wall of the bore 38.

In FIG. 3, the rotor magnet 32 is shown in a position where its magnetic poles are closely adjacent like magnetic pole plates of the stator magnet. Accordingly, the magnetic fields of the two magnets are in an additive relationship such that the magnetic field existing between the adhering surfaces 35a, 36a at the bottom ends of the pole pieces 35, 36 is greatly strengthened and presents a strong attractive force to magnetic materials. In FIG. 3, the magnetic lines of force are shown extending in a path (shown in dashed line) through the rotor magnet 32 and the poles thereof, through the pole pieces 35 and 36, and a magnetically attracted object or payload 50 which is securely held against the adhering surfaces 35a and 36a.

Figure 5:
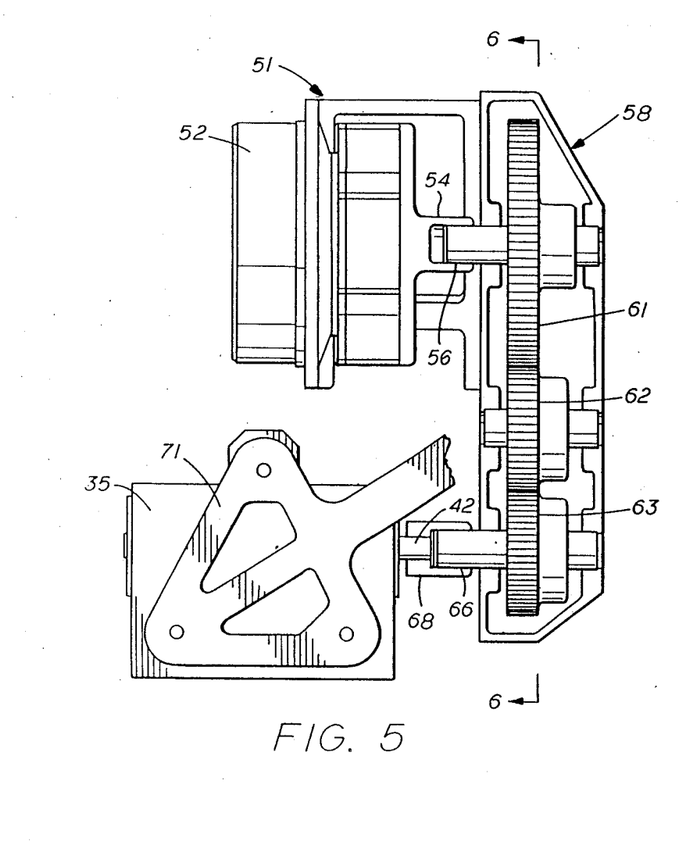
FIG. 5 is a side view, partly in section, of the magnetic attachment mechanism of FIG. 1, showing details of a rotary actuator for selectively rotating the permanent magnet which serves as the rotor magnet in the magnetic attachment mechanism.
Figure 6:
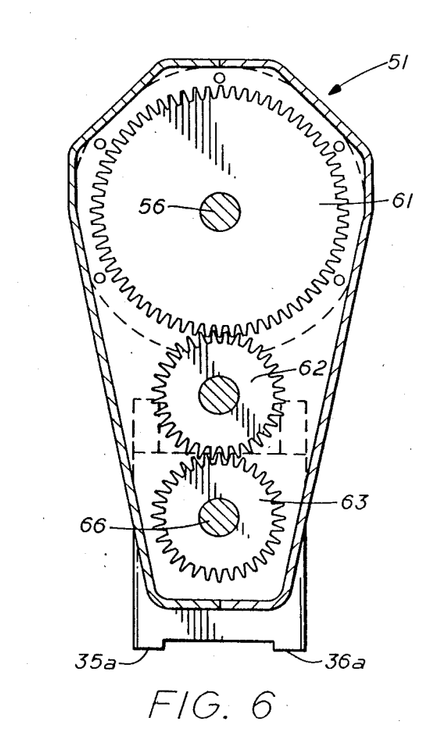
FIG. 6 is a sectional view of the gear drive of the rotary actuator as taken along the section line 6—6 in FIG. 5.

In FIG. 4, the rotor magnet 32 has been turned through an angle of 180° with respect to its position in FIG. 5. As a result, the magnetic S pole of the rotor magnet 32 is adjacent the magnetic N pole plate of the stator magnet 31 and its magnetic N pole is closely adjacent the S pole plate of the stator magnet. Accordingly as shown in dashed line in FIG. 4, the magnetic lines of force are concentrated between the closely adjacent unlike poles of the two magnets, thereby effectively bypassing the longer route from an adhering surface 35a of pole plate 35, through the payload 50 and the pole plate 36. In this "OFF" position of the rotor magnet 32, a very weak magnetic field exists between the adhering surfaces 35a, 36a and objects which had been firmly grasped by the magnetic attachment mechanism 12 when the rotor was in the "ON" position are easily released.

An actuator 51 for selectively rotating the rotor magnet 32 to either the "ON" position depicted in FIG. 3 or the "OFF" position shown in FIG. 4 is illustrated in FIG. 5. The actuator 51 comprises a stepping motor 52, the motor shaft of which is coupled by a shaft coupler 54 to the input shaft 56 of a gear train enclosed within a gear box 58. For purposes of compactness, the gear train comprises a succession of meshed gears 61, 62 and 63. The input shaft 56 delivers the output of the motor shaft through its associated gear 61 to the output shaft 66 of the gear 63 which is coupled by a shaft coupler 68 to the shaft 42 of the rotor magnet 32.

As shown in FIG. 5, a bracket such as the bracket 71, may be bolted to each of the pole plates 35, 36 to facilitate mounting of the magnetic attachment mechanism 12 including the actuator 51 within a housing which is designed for connection to the end of a manipulator arm. Electrical power for the stepping motor 52 can then be supplied from an electrical cable in the manipulator arm.

Figure 8:
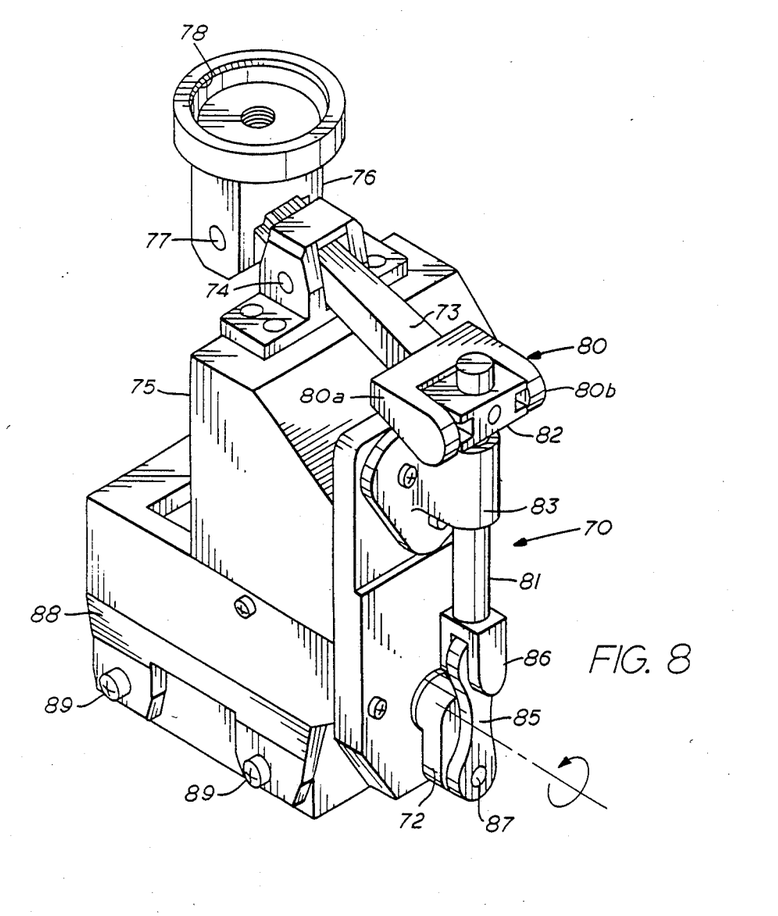
FIG. 8 is a view in perspective of an alternate embodiment of actuation means in the form of a linkage assembly which operatively connects the magnetic attachment mechanism of the invention with the manipulator arm of a remote manipulation system.

An alternative form of actuator for rotating the rotor magnet 32 is shown in FIG. 8. This embodiment of the actuator is in the form of a mechanical linkage 70 for turning a crank 72 which is affixed to the shaft of the rotor magnet for imparting axial rotation thereto. The linkage comprises a lever 73, pivoted on a fulcrum 74 fixed on a pivot block 75 of non-magnetic material and a grapple fixture translator 76 pivotally mounted about a pivot pin 77 fixed on one end of the lever 73. The translator 76 is provided with a cup-like circular bore 78 at its free end which is adapted to receive the end of an axially movable grapple shaft 79 (FIG. 9) connectable to an end effector on the manipulator arm. For this purpose, the bore 78 is internally threaded for accommodating a threaded connection with the end of the grapple shaft 79. Axial movement of the grapple shaft 79 in either direction can then be controlled by the end effector and the associated remote manipulator system.

As its other end, lever 73 is provided with a yoke 80 from which is suspended a shaft 81 affixed to a slide translator 82. The slide translator 82 is provided with trunnions (not shown) which are journalled for rotation between the arms 80a, 80b of the yoke 80. The shaft 81 is mounted for axial movement within a slide bushing 83 fixed to one side of the pivot block 75. An actuator link 85 is suspended at one end from a pivot pin 86 mounted transversely with respect to the shaft 81. The other end of the actuator link 85 is connected to the crank 72 by a pivotal connection 87.

As apparent from FIG. 8, an upward movement of the grapple fixture translator 76, as may be induced by the grapple shaft 79 controlled by the end effector of a manipulator arm, will pivot the lever 73 to move the shaft 81 axially downwardly, thereby imparting a rotation of the crank 72. Assuming the limit of axially downward movement of the shaft 81 corresponds to the "ON" position of the rotor magnet 32, a counter rotation of the crank 72 to be effected by a downward movement of the grapple fixture translator 76 and corresponding upward movement of the shaft 81 results in a 180° rotation of the rotor magnet 32 about its axis whereby the rotor magnet is placed in the "OFF" position and a minimal magnetic field exists at the adhering surfaces 35a, 36a of the magnetic attachment mechanism. In FIG. 8, the magnet assembly such as shown in FIGS. 4 and 5 is mounted within a partially enclosing housing having side walls such as the wall 88 to which the pole plates 35, 36 of the stator magnet 31 are attached by screws 89.

Figure 9:
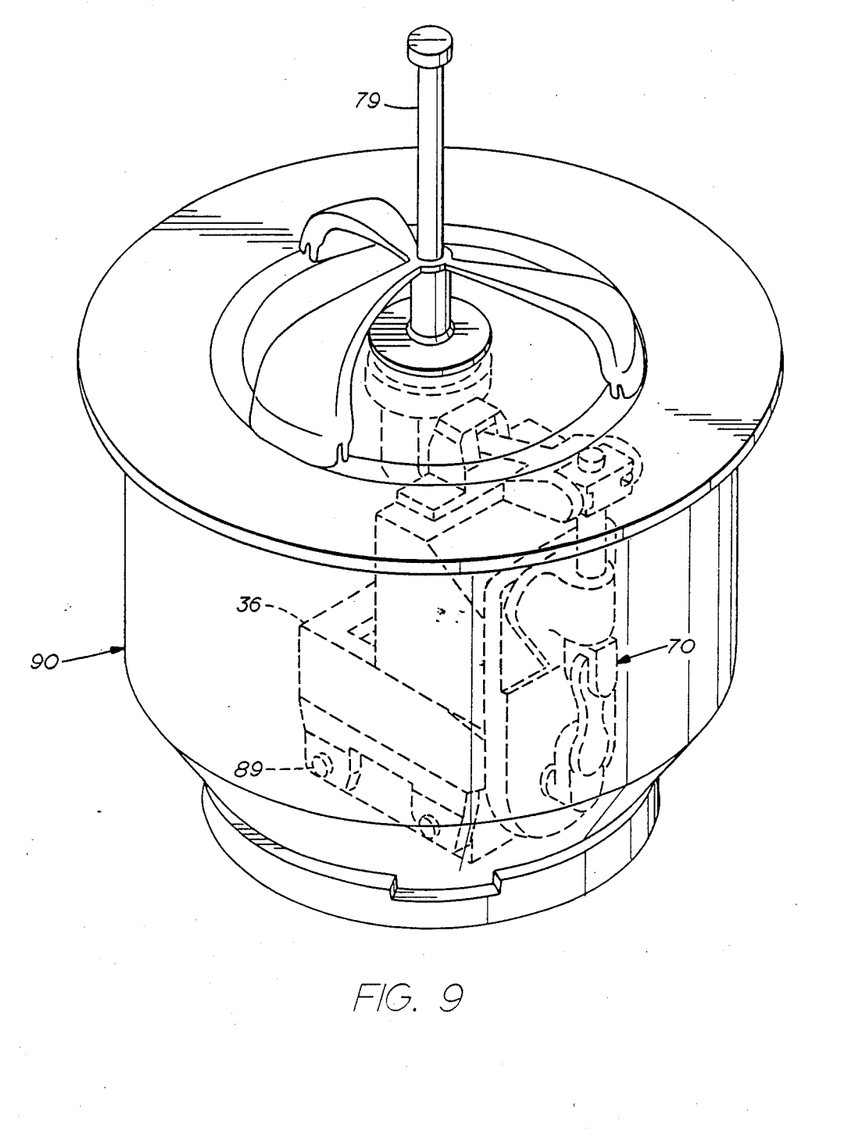
FIG. 9 is a view in perspective showing the magnetic attachment mechanism and actuator of FIG. 8 mounted within a housing adapted for connection to a manipulator arm.

The magnetic attachment mechanism 12 with linkage type actuator of FIG. 8 is shown in broken lines in FIG. 9 enclosed by a larger cylindrical housing 90 which is designed for interfacing and connecting with the end of a manipulator arm of a remote manipulator system.

In order to provide a large holding capability for the magnetic attachment mechanism 12, permanent magnets of rare earth materials are employed. A suitable material is Crumax 322 which includes as constituents, Boron, Neodymium, and Iron, and is a commercial product of Crucible Magnetics Co. For the pole pieces and pole plates, a highly magnetic steel such as steel 1010 is a preferred material, although Vanadium-Permandeur may be an alternative. For the non-magnetic support block 38, a Series 300 steel is appropriate.

Figure 7:
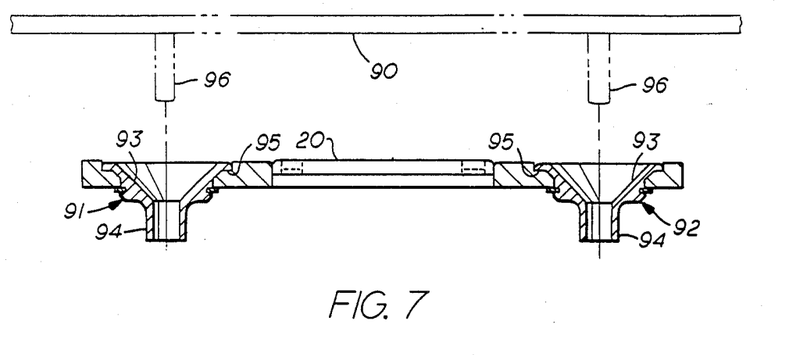
FIG. 7 is a sectional view of a payload interface with ferrous plate adapted for mounting a payload structure to be captured by the magnetic attachment mechanism of the invention.

It is, of course, desirable that the object or payload be fabricated from or include a magnetic material such as steel 1010 or other highly magnetic ferrous material. To insure a strong and rigidized attachment, a ferrous plate is mounted on the object or payload to be attached. Such a ferrous plate 20 is shown mounted on the payload 14 in a typical space mission application of the magnetic attachment mechanism 12. A pair of steel cups 91, 92 are also mounted on the payload on opposite sides of the ferrous plate 20 and serve as means for clamping the plate 20 to the payload and for guiding the magnetic attachment mechanism 12 to make a rigidized attachment to the payload. As shown in FIG. 7, each cup 91, 92 includes an inner frustoconical surface, such as the surfaces 93 and a tubular axial stem extension 94 which is welded or otherwise connected to the payload structure. Each cup 91, 92 also includes an annular flange 95 provided around the wide end of the conical surface 93 and which when placed in overlapping relation with the surface of the ferrous plate 20, serves to clamp the ferrous plate to the payload.

Also, when a manipulator arm, such as the manipulator arm 11 of FIG. 1 with magnetic attachment mechanism 12 affixed, is guided toward the payload 14, a pair of rod-like extensions 96 affixed to the underside of the housing 90 make contact with the frusto-conical surfaces 93 and enter into the bores of the tubular extensions 94 to rigidize the connection of the payload 14 with the adhering surfaces 35a, 36a of the magnetic attachment 12. The rods 96 are so located on the housing that when in place in the cups 91, 92, the adhering surfaces 35a, 36a of the stator magnet pole plates are in contact with the ferrous plate 20 throughout their full surface area.

It will therefore be seen that a unique magnetic attachment mechanism is disclosed herein which is particularly adapted for connection to the manipulator arm of a remote manipulator system and to be operably controlled thereby for effecting the capture and release of a payload. The payload must include magnetic material so as to be susceptible to the magnetic attractive force of the mechanism and for this purpose is provided with a magnetic ferrous plate and cooperable guide means are provided on the payload and the mechanism housing for effecting an optimal rigidized attachment with the mechanism.

In an embodiment of a rare earth magnet assembly as described herein, of only a few inches in length and width, it has been possible to achieve a strong magnetic field at the adhering surfaces of the pole plates such that a breakaway force in excess of 800 lbs. is required to dislodge a ferrous plate of ¼ inch thickness from the magnetic attachment mechanism when in the "ON"

condition. On the other hand in the "OFF" condition, the magnetic field at the adhering surfaces is effectively removed and so weakened that a paper clip is easily released.

It is to be understood that the foregoing description of a preferred embodiment of the invention has been presented for purposes of illustration and is not intended to limit the invention to the precise form disclosed. For example, the polar plates 35, 36 could be other than rectangular plates, such as cylindrical segments of arcuate cross section, and the ferrous plate 20 formed in accommodating conforming configuration. The magnetic core of the rotor and stator magnets could also be changed to permit variations in magnetic strength for accommodating different payloads. It is to be appreciated therefore that changes may be made by those skilled in the art without departing from the spirit of the invention.

What is claimed is:

1. A magnetic attachment mechanism adapted for interfacing with the manipulator arm of a remote manipulator system and comprising a pair of permanent magnets arranged in a stator-rotor relationship, one of said magnets constituting a stator magnet having a pair of pole plates extending therefrom in substantially parallel relationship to one another and each of said pole plates includes an adhering surface, the other of said magnets constituting a rotor magnet mounted between said pole plates and journalled for rotation about an axis intermediate its magnetics poles;

wherein said rotor magnet being of elongate form symmetrical about its central longitudinal axis with the magnetic lines of force of its magnetic field passing through the magnet in a direction transverse to said longitudinal axis and having a shaft affixed coaxial with respect thereto and said actuator means comprises a stepping motor having a motor shaft and a gear transmission coupled to said motor and rotor magnet shafts for selectively rotating the rotor magnet between first and second rotary positions, said first position corresponding to a position wherein each of the poles of the rotor magnet is closely adjacent a one of the said pole plates which is of like polarity whereby the magnetic fields of said rotor and stator magnets are in additive relationship producing a strong magnetic field at said adhering surfaces and a magnetic attractive force for a payload or workpiece having a member of magnetic material;

said second position corresponding to a position wherein each of the poles of the rotor magnet is disposed closely adjacent a one of said pole plates which is of unlike polarity whereby the magnetic fields of said rotor and stator magnets are in cancelling relationship at said adhering surfaces; and said actuator means being adapted for interfacing connection with an effector end of said manipulator arm.

2. A magnetic attachment mechanism adapted for interfacing with the manipulator arm of a remote manipulator system and comprising a pair of permanent magnets arranged in a stator-rotor relationship, one of said magnets constituting a stator magnet having a pair of pole plates extending therefrom in substantially parallel relationship to one another and each of said pole plates includes an adhering surface, the other of said magnets constituting a rotor magnet mounted between said pole plates and journalled for rotation about an axis intermediate its magnetics poles;

actuator means for selectively rotating the rotor magnet between first and second rotary positions, said first position corresponding to a position wherein each of the poles of the rotor magnet is closely adjacent a one of the said pole plates which is of like polarity whereby the magnetic fields of said rotor and stator magnets are in additive relationship producing a strong magnetic field at said adhering surfaces and a magnetic attractive force for a payload or workpiece having a member of magnetic material;

said second position corresponding to a position wherein each of the poles of the rotor magnet is disposed closely adjacent a one of said pole places which is of unlike polarity whereby the magnetic fields of said rotor and stator magnets are in cancelling relationship at said adhering surfaces;

said mechanism being provided with a housing adapted for interfacing with the end of said manipulator arm, cooperable guide means on said housing, and a payload to be attached to said mechanism, said payload being provided with a ferrous plate of magnetic material mounted thereon and said guide means are cooperable to effect an optimal rigidized attachment of said mechanism with the payload wherein the adhering surfaces of said stator polar plates are in firm contact with said ferrous plate, wherein said housing is provided with rod-like extension members projecting at the end of the housing adjacent the adhering surfaces of said pole plates and said payload is provided with receiving members, each receiving member having a conical surface for receiving one of said housing extension members and guiding the magnetic attachment mechanism to a rigidized optimal connection with the payload.

3. The mechanism of claim 2 wherein said rotor magnet is provided with a shaft affixed coaxial with respect thereto and said actuator means comprises a stepping motor having a motor shaft and a gear transmission coupled to said motor and rotor magnet shafts for selectively rotating the rotor magnet between said first and said second rotary positions.

4. The mechanism of claim 2 wherein said rotor magnet is provided with a shaft affixed coaxial with respect thereto and said actuator means comprises a mechanical linkage which includes a crank member coupled to said rotor magnet shaft and an axially movable grapple shaft adapted for coupling to an end effector of said manipulator arm and to said crank member by said linkage whereby the grapple shaft may be moved in a selected axial direction to effect a rotation of said rotor magnet to said first and said second rotary positions.

5. A magnetic attachment mechanism adapted for interfacing with the manipulator arm of a remote manipulator system and comprising a pair of permanent magnets arranged in a stator-rotor relationship, one of said magnets constituting a stator magnet having a pair of pole plates extending therefrom in substantially parallel relationship to one another and each of said pole plates includes an adhering surface, the other of said magnets constituting a rotor magnet mounted between said pole plates and journalled for rotation about an axis intermediate its magnetic poles;

said rotor magnet being of elongate form symmetrical about its central longitudinal axis with the magnetic lines of force of its magnetic field passing through the magnet in a direction transverse to said longitudinal axis and having a shaft affixed coaxial with respect thereto;

actuator means comprising a mechanical linkage which includes a crank member coupled to said rotor magnet shaft and an axially movable shaft adapted for coupling to an end effector of said manipulator arm and to said crank member by said linkage whereby the shaft may be moved in a selected axial direction to effect a rotation of said rotor magnet to selected one of said first and said second rotary positions, said first position corresponding to a position wherein each of the poles of the rotor magnet is closely adjacent a one of the said pole plates which is of like polarity whereby the magnetic fields of said rotor and stator magnets are in additive relationship producing a strong magnetic field at said adhering surfaces and a magnetic attractive force for a payload or workpiece having a member of magnetic material;

said second position corresponding to a position wherein each of the poles of the rotor magnet is disposed closely adjacent a one of said pole plates which is of unlike polarity whereby the magnetic fields of said rotor and stator magnets are in cancelling relationship at said adhering surfaces; and said actuator means being adapted for interfacing connection with an effector end of said manipulator arm.

* * * * *